United States Patent
Farid et al.

(10) Patent No.: US 11,143,770 B1
(45) Date of Patent: Oct. 12, 2021

(54) SYSTEM AND METHOD FOR PROVIDING REAL-TIME PREDICTION AND MITIGATION OF SEISMICALLY-INDUCED EFFECTS IN COMPLEX SYSTEMS

(71) Applicant: Massachusetts Institute of Technology, Cambridge, MA (US)

(72) Inventors: Maor Farid, Brighton, MA (US); Themistoklis Sapsis, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/995,705

(22) Filed: Aug. 17, 2020

Related U.S. Application Data

(60) Provisional application No. 63/031,442, filed on May 28, 2020.

(51) Int. Cl.
  *G01V 1/30* (2006.01)
  *G06K 9/62* (2006.01)
  (Continued)

(52) U.S. Cl.
  CPC .............. *G01V 1/30* (2013.01); *G01V 1/008* (2013.01); *G01V 1/247* (2013.01); *G01V 1/282* (2013.01);
  (Continued)

(58) Field of Classification Search
  CPC .......... G01V 1/30; G01V 1/008; G01V 1/247; G01V 1/282; G06K 9/6256; G06K 9/6298; G06N 3/0445
  See application file for complete search history.

(56) References Cited

U.S. PATENT DOCUMENTS

| 7,277,797 | B1 | 10/2007 | Kunitsyn et al. |
| 2013/0201792 | A1* | 8/2013 | Douma ................... G01V 1/38 367/24 |

(Continued)

FOREIGN PATENT DOCUMENTS

CN  106019359  10/2016

OTHER PUBLICATIONS

Moustra, et al; "Artificial Neural Networks for Earthquake Prediction Using Time Series Magnitude Data or Seismic Electric Signals"; Expert Systems with Applications 38 (2011).
(Continued)

*Primary Examiner* — Bryan Bui
(74) *Attorney, Agent, or Firm* — Peter A. Nieves; Sheehan Phinney Bass & Green PA

(57) ABSTRACT

Providing real-time prediction and mitigation of seismically-induced effects comprises receiving measured seismic data; pre-processing to transform to a uniform format; inputting the preprocessed data into a predictive model; training the predictive model to learn hidden patterns in recorded seismic data, and extract underlying relations between the received measured seismic data and a predicted response at a location of interest at further time instance, as described by the equation: $u_I^{pred}(t+\tau)=\text{model}(u_I(t), u_{M_1}(t), u_{M_2}(t), \ldots, u_{M_N}(t))$, where t is current time instance, $\tau$ is lead time, $u_{M_i}(t)$ represents digital signal recorded by the $i^{th}$ seismic sensor, and N is overall number of sensors in a sensor array that provided the measured seismic data; receiving new real-time seismic data and pre-processing the received new real-time seismic data into the uniform format; inputting the data into the predictive model; and predicting future response at the location of interest in lead time of $\tau$ ahead: $u_I^{pred}(t+\tau)$.

13 Claims, 6 Drawing Sheets

(51) Int. Cl.
*G01V 1/24* (2006.01)
*G01V 1/00* (2006.01)
*G06N 3/04* (2006.01)
*G01V 1/28* (2006.01)

(52) U.S. Cl.
CPC ......... *G06K 9/6256* (2013.01); *G06K 9/6298* (2013.01); *G06N 3/0445* (2013.01); *G01V 2210/72* (2013.01)

(56) References Cited

U.S. PATENT DOCUMENTS

2019/0018157 A1* 1/2019 Robertsson .............. G01V 1/36
2021/0018639 A1* 1/2021 Sun ....................... G01V 1/303

OTHER PUBLICATIONS

International Search Report and Written Opinion for PCT/US20/46714 dated Nov. 18, 2020.

* cited by examiner

SYSTEM AND METHOD FOR PROVIDING REAL-TIME PREDICTION AND MITIGATION OF SEISMICALLY-INDUCED EFFECTS IN COMPLEX SYSTEMS

CROSS-REFERENCE TO RELATED APPLICATIONS

This application claims the benefit of U.S. Provisional Patent Application Ser. No. 63/031,442, filed May 28, 2020, entitled "System and Method for Providing Real-Time Prediction and Mitigation of Seismically-Induced Effects in Complex Systems," which is incorporated by reference herein in its entirety.

FIELD OF THE INVENTION

The present invention generally relates to early seismic activity detection, and, more particularly, to systems and methods that provide real-time prediction and mitigation of seismically-induced effects.

BACKGROUND OF THE INVENTION

Since the year 2000, more than 800,000 people worldwide have been killed due to earthquakes, and millions have been wounded or reported missing. Countries around the world have suffered major destruction caused by earthquakes, for instance, Haiti (2010, magnitude 7.0, 316,000 casualties), Japan (2011, magnitude 9.1, 22,000 casualties) and Nepal (2015, magnitude 7.8, 8,000 casualties). These countries hold industrial and tactical security facilities with major national interests, such as, petrochemical factories, chemical factories, nuclear power plants, and more.

When exposed to seismic-induced vibration or other external excitations, irreversible hazardous catastrophes might affect population centers and lead to long-term consequences. In addition to the high cost of human life, vast and irreparable environmental and ecological damage has occurred on multiple levels, including air, water, and groundwater pollution, as well as extinction of animal species. Among the most vulnerable and hazardous are tall buildings, large structures, and tanks containing hazardous fluids, which are prevalent in the chemical, nuclear, and petroleum industries. Damage to these structures not only bears immediate consequences, but also long-term effect. For example, in the seismically-induced nuclear catastrophe in Fukushima, Japan (2011), both the cores and their coolant reservoirs were damaged. The resultant loss-of-coolant accidents led to nuclear meltdown in three cored, three hydrogen explosions, and the release of severe radioactive contamination. More than 150,000 residences, were evacuated from the surrounding area of 20 kilometers around the plant. Large amounts of contaminated water with radioactive isotopes were released to the Pacific Ocean. Traces of radioactive isotopes are still present in soils, plants, vegetation and water sources even in distant areas with respect to the nuclear plant, leading to severe damage to agriculture and animals. More than 200,000 dollars were invested in an ongoing intense cleanup program. However, estimates show that this region will not be repopulated during the following decades. According to the World Nuclear Association, 20% of the world's nuclear facilities are located in seismically active regions. Hence, extensive efforts should be made to predict and mitigate similar accidents in the future.

During the last years, extensive studies have been made in order to predict the effects of a given earthquake at a location of interest (LOI). Those computational models, such as finite-difference method (FDM), finite element method (FEM) and boundary element method (BEM), etc., are available in commercial programs such as Ansys, COMSOL Multiphysics, SolidWorks, etc., and are useful for various domains and disciplines, such as structural mechanics, fluid mechanics, and more. Those programs mesh the system by dividing it into multiple elements, and solve the constitutive equations and the constitutive equations of the medium in each of them separately while satisfying a set of boundary conditions. Those models still require prior measurements to assess the parameters of the system, a full 3D model describing the system's geometry and boundary conditions, which might be very difficult and sometimes not applicable for complex systems. Secondly, those numerical simulations are extremely costly in terms of time and computational resources required, making real-time analysis and prediction practically impossible. This, even though the average energy propagation speed of the most potentially hazardous type of seismic waves (i.e., S-waves) is approximately 200 meters per second (Sands and clays), leading to a potential time window of several minutes between release and arrival of the seismic wave from the focus to the location of interest/ Therefore, in many real-world systems, full modelling as a concept is not applicable, making the current system and method highly desirable.

SUMMARY OF THE INVENTION

Embodiments of the present invention provide a system and method for providing real-time prediction and mitigation of seismically-induced effects in complex systems. Briefly described, the method includes the steps of: receiving measured seismic data, wherein the measured seismic data contains dynamic data and temporal data; pre-processing the measured seismic data to transform the measured seismic data to a uniform format; inputting the preprocessed data into a predictive model; training the predictive model so that the predictive model learns hidden patterns in recorded seismic data, and extracts underlying relations between the received measured seismic data and a predicted response at a location of interest at further time instance, as described by the equation $u_f^{pred}(t+\tau) = \text{model}(u_f(t), u_{M_1}(t), u_{M_2}(t), \ldots, u_{M_N}(t))$, where t is the current time instance, $\tau$ is the lead time, $u_{M_i}(t)$ represents the digital signal recorded by the $i^{th}$ seismic sensor, and N is the overall number of sensors in a sensors array that provided the measured seismic data; receiving new real-time seismic data and pre-processing the received new real-time seismic data into the uniform format; inputting the pre-processed received new real-time seismic data into the predictive model; and the predictive model predicting future response at the location of interest in lead time of T ahead: $u_f^{pred}(t+\tau)$.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead

DETAILED DESCRIPTION

The present system and method uses a pre-trained machine learning-based technology on previously measured and gathered seismic data in order to capture patterns of energy propagation through the soil in real-time and forecast the energy reached in locations of interest (LOIs) so as to allow for prompt response. Computational time for determining potentially hazardous conditions due to an earthquake is decreased by use of the present system and method, allowing for real-time assessment.

The present system and method provides real-time prediction of seismic energy propagation by combining sampling, modelling and prediction of complex nonlinear dynamical systems, as described herein. After the predictive model is trained on recorded data, it can obtain the response that is about to take place in a chosen LOI before it takes place, and by that in cases of hazardous consequences, allowing to take the proper safety measures in those locations, send warnings and safety instructions to citizens, inform the authorities and emergency forces and more.

Figure 1:
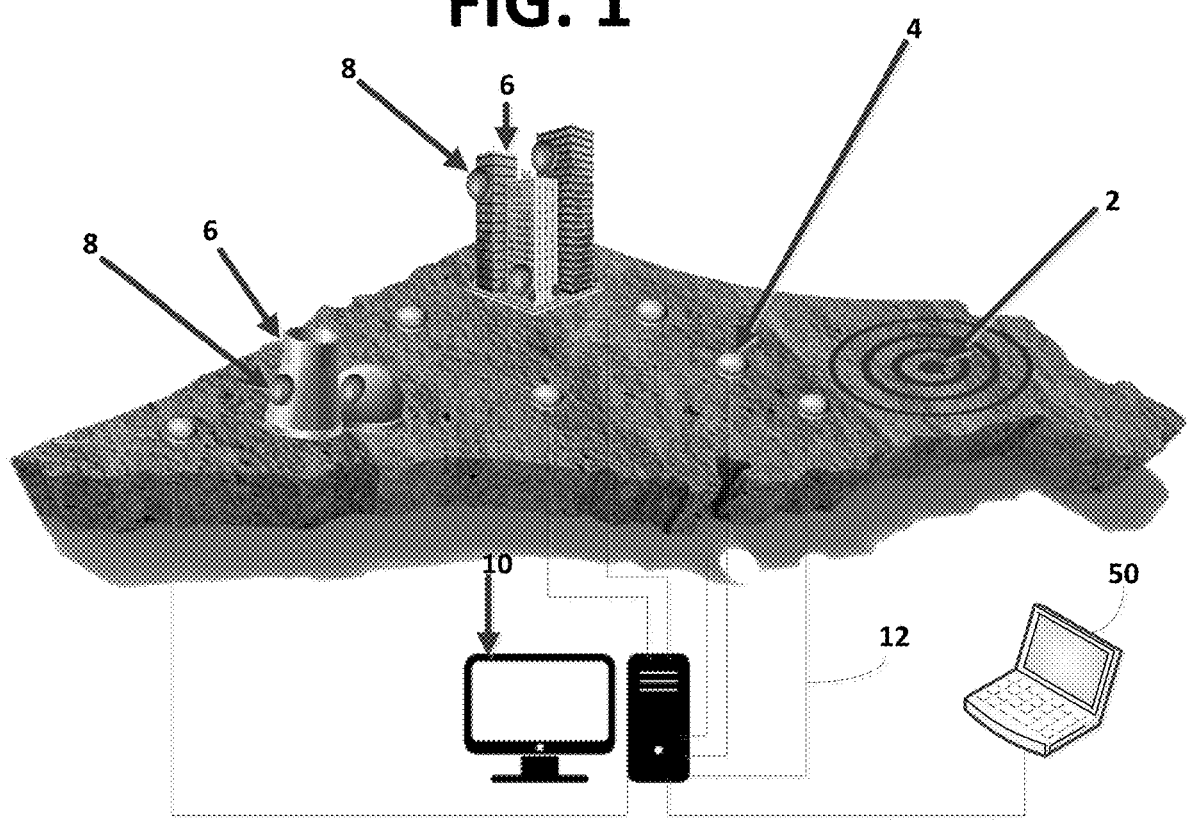
FIG. 1 is a schematic illustration of an environment in which the present system and method may be provided.

FIG. 1 is a schematic illustration of an environment in which the present system and method may be provided. As illustrated, energy from an earthquake propagates from the focus 2, which is measured by an optimally distributed array of sensors 4. The sensors 4 may be known vibrations sensors that may be used for detection of earthquakes.

As will be described in detail hereinbelow, the seismic data is analyzed in real-time and fed to a prediction model provided within a central server 10, as described herein. In accordance with the present system and method, safety instructions and time estimations are generated respectively by the central server 10. Simply for illustrative purposes, FIG. 1 demonstrates that when undesired seismic energy flows into a structure of interest 6, it may be captured and dissipated by an attached passive energy absorber (PEA) 8.

The Seismic Data

The seismic data is measured by a given array of seismic sensors which may differ in their type and properties. The recorded digital signals are a numerical array of data points, each point consists of both dynamical data (i.e. the measures of acceleration, velocity or displacement) and temporal data which defines the time instance in which each point was measured. Since the current signals are digital, they are discrete, meaning that they have a finite sampling rate which differs from one sensor to another. Each sampling point is defined by a dynamical value (i.e. acceleration, velocity or displacement, depends on the type of the sensor), and a time stamp that defines the time instance in which the corresponding measurement was taken. Before inputting the seismic data into the predictive model during a training process or real-time prediction process, the seismic data has to go through a pre-processing stage in which it is transformed to a desired uniform format.

Figure 2:
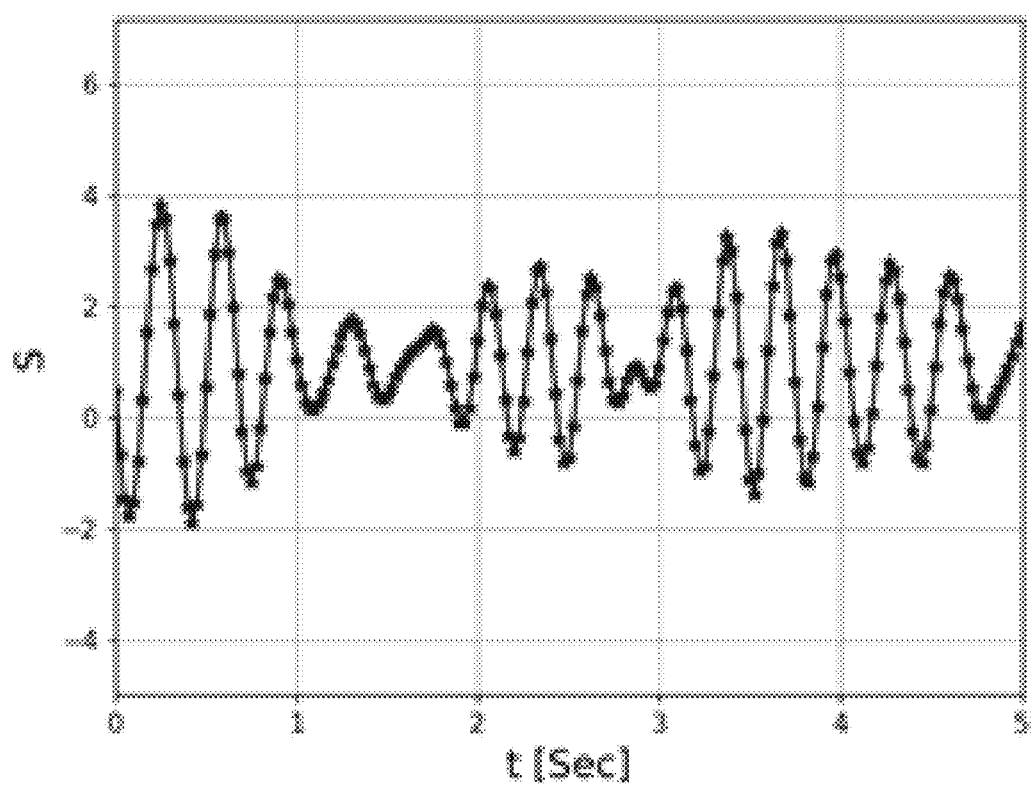
FIG. 2 is a schematic diagram providing an example of a recorded seismic data digital signal.

FIG. 2 is a schematic diagram providing an example of a recorded digital signal. Each of the consecutive data points are connected by a solid line. The horizontal axis represents time, and the vertical axis represents the measured dynamical value (acceleration, velocity or displacement). Each data point (asterisk) is defined by dynamical value and time stamp, which represents the time instance in which this measurement was taken.

Data Pre-Processing Module

Figure 3:
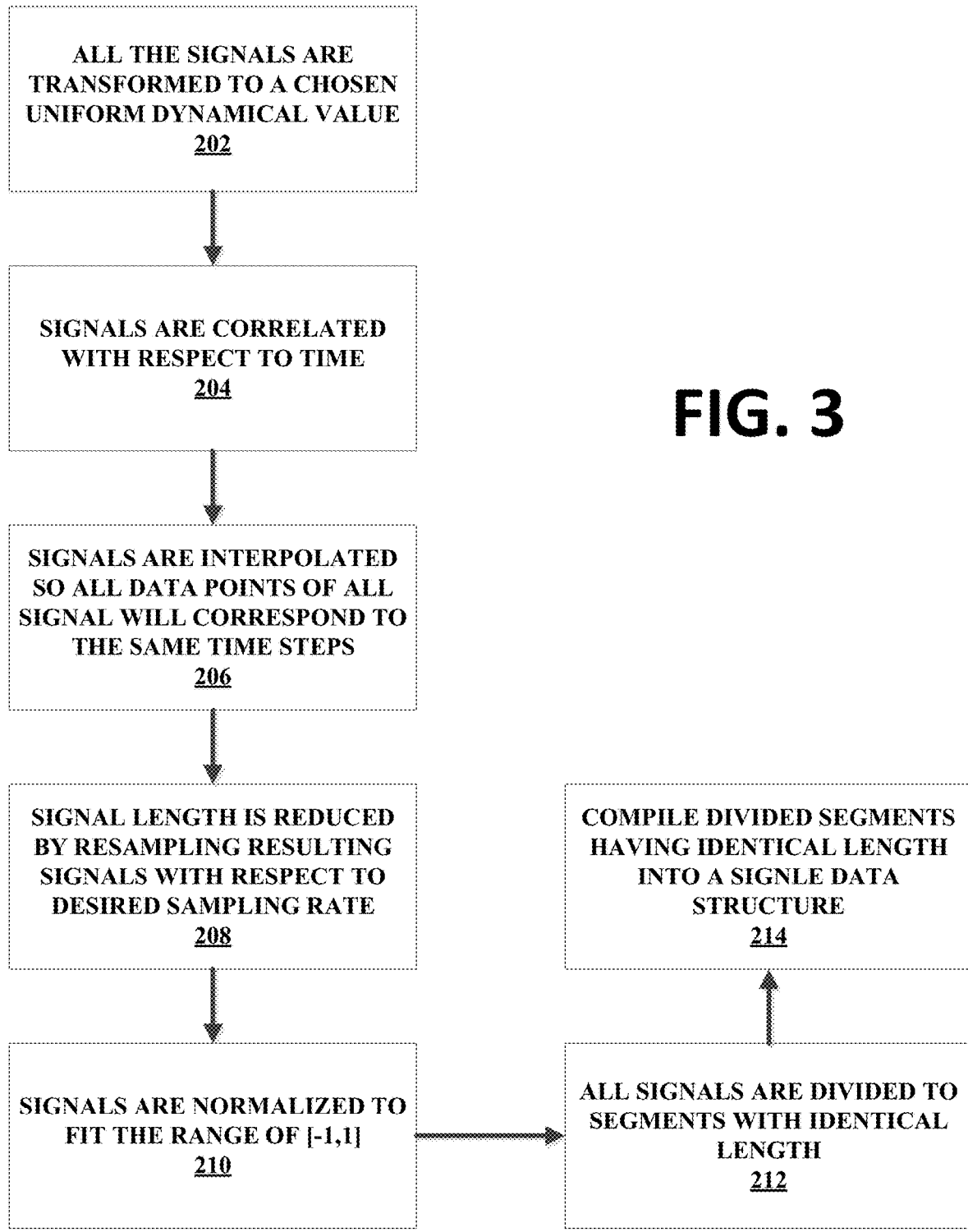
FIG. 3 is a flowchart exemplifying steps taken by the data pre-processing module of the present system and method so as to take input data from the sensor array and output in a processed data structure that can be an input for the predictive model.

Before inputting into the predictive model, all signals have to be brought to an identical format. FIG. 3 is a flowchart exemplifying steps taken by the data pre-processing module so as to take input data from the sensor array and output in a processed data structure that can be an input for the predictive model. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, all the signals are transformed to a chosen uniform dynamical value, for example acceleration (velocity and displacement data are converted by one or two derivations with respect to time, respectively). The signals are then correlated with respect to time (block 204). As shown by block 206, all signals are then interpolated in order that all the data points of all signals will correspond to the same time steps. Length of the signals is reduced by resampling the resulting signals with respect to a desired sampling rate (block 208). As shown by block 210, the signals are then normalized to fit the range of [−1,1]. All signals are then divided to segments with identical length, as shown by block 212. The signals divided into segments with identical length are then compiled into a single data structure, as shown by block 214, which serves as the input of the predictive model. All data that is being inputted into the predictive model, either during training or during a real-time prediction stage, has to go through the same pre-processing process, and must have the same scale and structure. All signals are normalized by consistent normalization values.

The Predictive Model

The predictive model consists of a long-short memory term recurrent neural network (LSTM RNN). RNNs are optimal for sequential data, such as the vibration signals measured from the system's Degrees of Freedom, and therefore, may be used in accordance with the present system and method. The LSTM is a specific type of RNN that was explicitly designed to avoid the long-term dependency problem, in which greater relevance is given to newly learned data. In other words, the LSTM allows to capture dynamical features by preserving a memory about data points from different locations in the learned signals. LSTMs are a special kind of RNN, capable of learning long-term dependencies. They were introduced by Hochreiter & Schmidhuber (1997) and are explicitly designed to avoid the long-term dependency problem. They are natural for remembering information for long periods of time. All recurrent neural networks have the form of a chain of repeating modules of neural network. LSTMs also have this chain like structure, but the repeating module has a different structure. Instead of having a single neural network layer, there are four modules which interact with one another. The LSTM does have the ability to remove or add information to the cell state, carefully regulated by structures called gates. Gates are a way to optionally let information through. They are composed out of a sigmoid neural net layer and a pointwise multiplication operation. The sigmoid layer outputs numbers between zero and one, describing how much of each component should be let through. A value of zero means complete block of the information while a value of one means complete memorization of the information.

In the current work, we use one LSTM layer with 128 hidden units, followed by one dense/fully connected layer with 64 hidden units and a rectified linear unit (ReLU) activation function to connect the input and output. The resulting model has a total of 76,032 model parameters.

Data-driven (or more precisely LSTM-based) prediction approaches serve as exclusively data-driven real-time forecasting methods for complex dynamical systems, and for soil and partially-filled fluid tanks in particular without the need for identifying the system's parameters, geometry, boundary conditions, underlying Equations of Motion or any mathematical model. The inputs and the outputs to and of the LSTM in the training process and the real-time prediction process have to be consistent in terms of dimensions.

The Training Process

Figure 4:
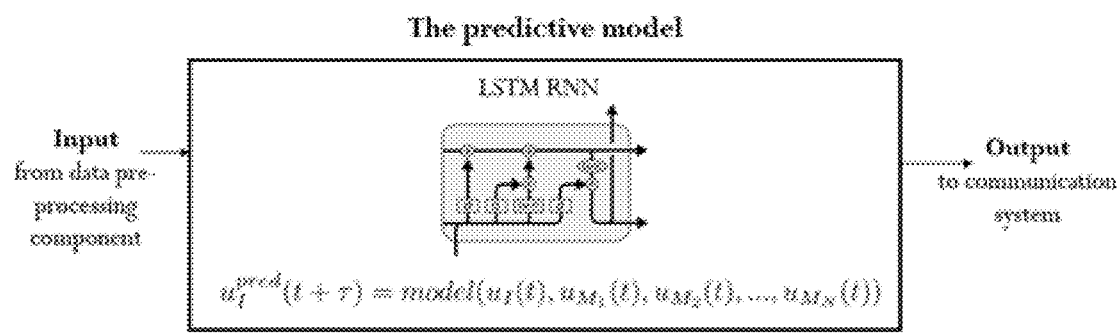
FIG. 4 is a schematic diagram generally illustrating the training process for the predictive model.

FIG. 4 is a schematic diagram generally illustrating the training process. During the training process, the predictive model of the present system and method learns the hidden patterns in the recorded seismic data, and extracts the underlying relations between the inputs (seismic signals from the sensors and the LOI) and the predicted response at the LOI at further time instance, as described by the following equation:

$$u_I^{pred}(t+\tau) = \text{model}(u_I(t), u_{M_1}(t), u_{M_2}(t), \ldots, u_{M_N}(t)) \quad \text{(Eq. 1)}$$

Here, t is the current time instance, $\tau$ is the lead time, $u_{M_i}(t)$ represents the digital signal recorded by the $i^{th}$ seismic sensor, and N is the overall number of sensors in the sensors array. The machine-learning based model consists of multiple parameters that define the mapping/relation between the inputs. The aim of the training process is to tune those parameters by learning large amounts of recorded data. Thus, the current model and method aims to find the mapping between the pre-processed digital signals measured up to time t: $u_I(t), u_{M_1}(t), u_{M_2}(t), \ldots, u_{M_N}(t)$ (input) and the response at the LOI at lead time ahead, i.e. $u_I^{pred}(t+\tau)$ (output).

The model parameters are tuned during the training stage of the predictive model. The loss function of the predictive model is defined as the difference between the predicted and the actual/ground truth (GT) value, which is calculated based on a chosen metric, such as L2 norm for example, which is given by the following equation:

$$L(u_I^{pred}(t+\tau), u_I^{GT}(t+\tau)) = \|u_I^{pred}(t+\tau) - u_I^{GT}(t+\tau)\|_2^2 \quad \text{(Eq. 2)}$$

The loss function defines the difference between the predicted and the GT value of the future response at the LOI, and during the training process, the goal is to tune the model parameters such that the loss function will be minimized. The tuning process of the model parameters is performed with the help of a numerical algorithm called Backpropagartion (Chauvin, Yves, and David E. Rumelhart, eds. *Backpropagation: theory, architectures, and applications*. Psychology press, 1995), in which the weights and biases of the model are corrected iteratively in order to minimize a chosen loss function that describes the learning performances of the model. For accurate prediction the loss function gets a low value, and the backpropagation algorithm performs only minor corrections to the weights and biases of the model, and for bad predictions the loss function gets a high value and the backpropagation algorithm performs major corrections to the weights and biases of the model.

Figure 5:
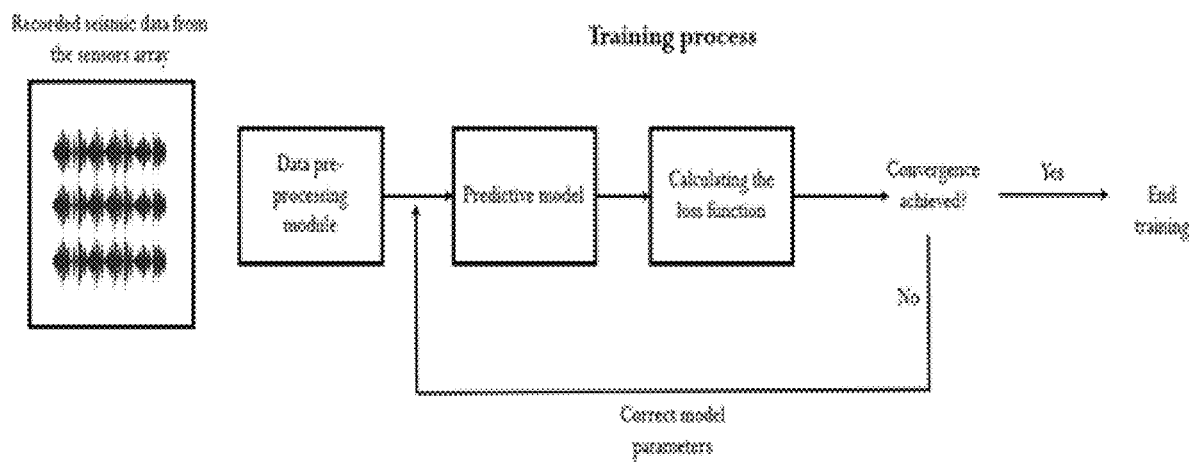
FIG. 5 is a block diagram further illustrating steps for training the predictive model in accordance with the present system and method.

Thus, convergence of the training/learning process is achieved when the loss function becomes lower than a chosen threshold, typically taken as $10^{-6}$, although the present invention is not limited to this. The training process is an iterative process, in which different portions of the dataset are inputted and their corresponding output are inputted into the predictive model, and loss function is calculated, and the model parameters are being corrected. FIG. 5 is a block diagram illustrating these described steps for training a predictive model in accordance with the present system and method.

After completion of the training process (i.e., when the model is pre-trained) it can serve as a predictive model. It is noteworthy that training further processes can be made periodically on new data (for example once a week, a month and so on), and by that, continue improving the predictive model by exposing it to additional data.

The Real-Time Prediction

Now, after the predictive model is trained, it is prepared to produce real-time prediction of real-time recorded data. The recorded signals (i.e., motion data and temporal data) from the sensors are transmitted to the central server via communication network (wireless, wired, internet, etc.), which are inputted to the data pre-processing software module, which brings the data into the aforementioned appropriate format. Then, the processed data is inputted into the predictive model that predicts the future response at the LOI in lead time of $\tau$ ahead: $u_I^{pred}(t+\tau)$. The time required to obtain the predicted response by the pre-trained model is substantially faster than the traditional prediction methods, such as FE analysis, and more.

Figure 6:
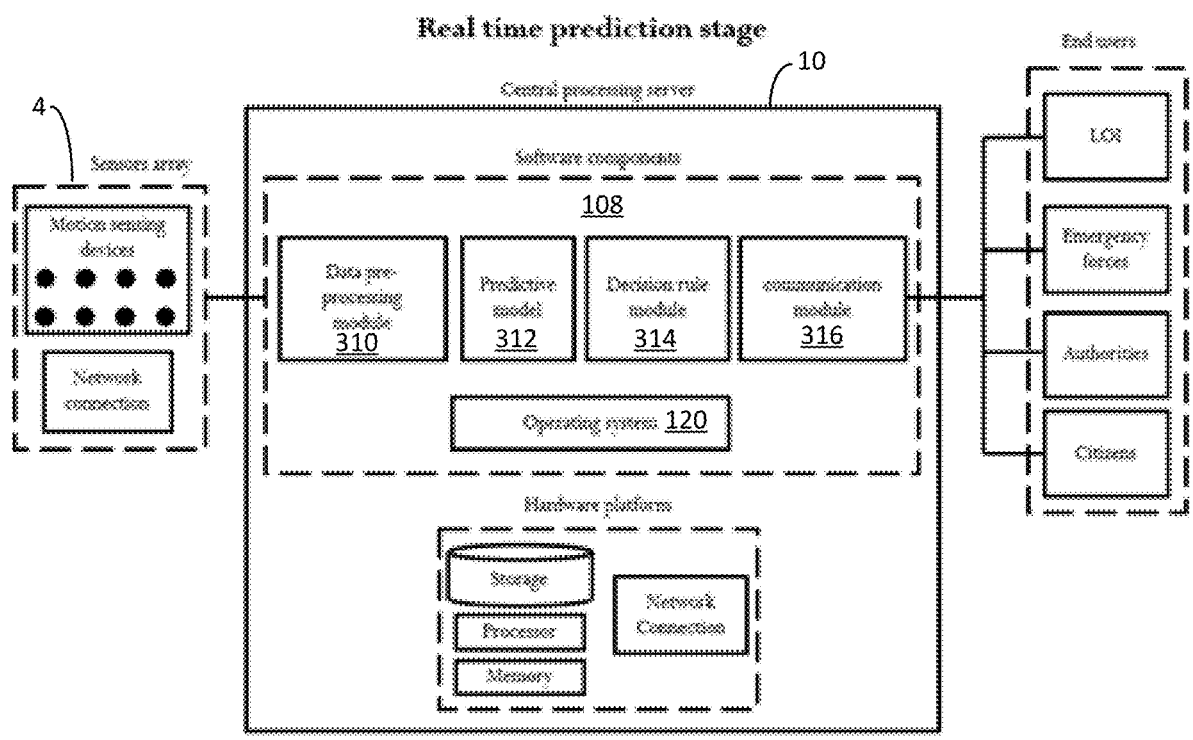
FIG. 6 is a schematic diagram better illustrating portions of the present system and method, including modules located within the central server.
Figure 7:
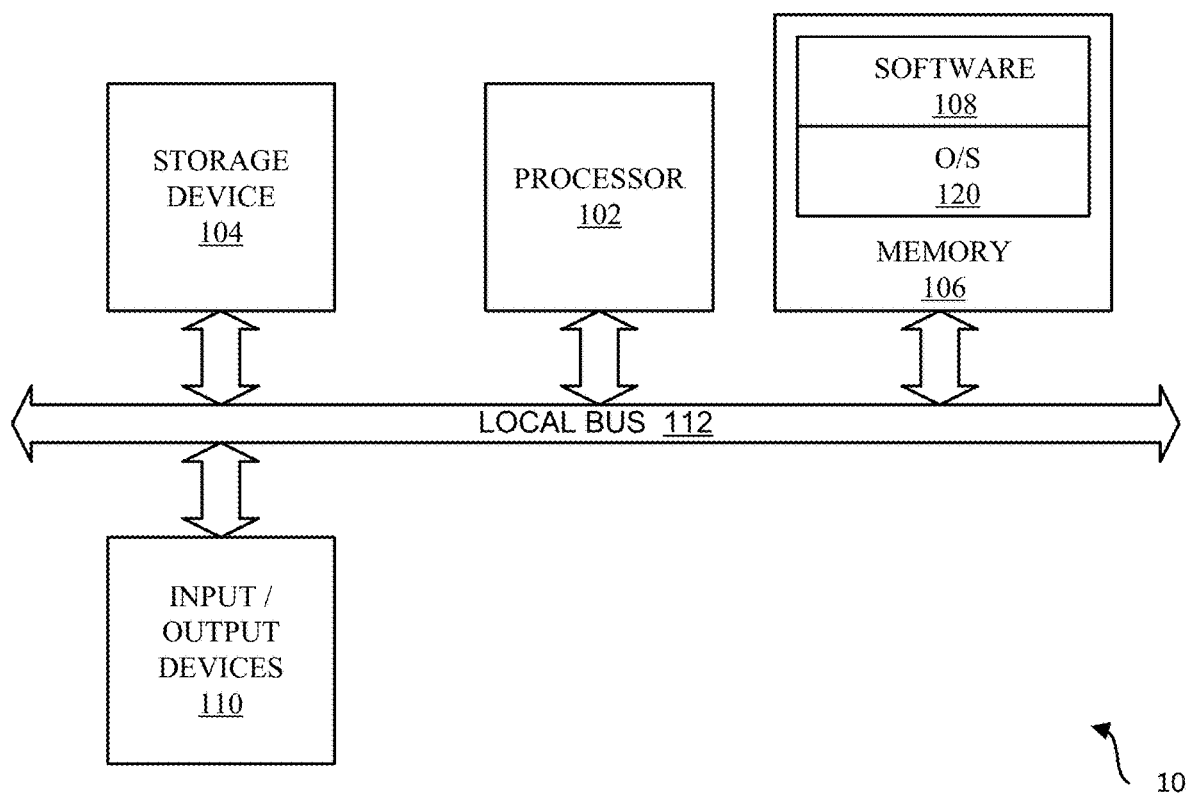
FIG. 7 is a schematic diagram further illustrating the central server of FIG. 6.

FIG. 6 is a schematic diagram better illustrating portions of the present system and method, including modules located within the central processing server 10, or central server. Further description of components within the central server 10 is provided with regard to FIG. 7. Referring to FIG. 6, the diagram demonstrates portions of the present system and method involved in providing real time prediction. As illustrated by FIG. 6, the sensor array 4, comprising the motion sensing devices, transmits seismic data to the central processing server 10. Different end users may use the present system and method, including, for example, end users located at the location of interest, emergency forces, authorities in the region, and citizens in the region. The central server 10 contains multiple modules therein, such as the data pre-processing module 310, functionality of which has been previously described, the predictive model 312, as previously described, a decision rule module 314, which will be described hereafter, and a communication module 316, which also will be described hereafter. Hardware of the central server 10 is described in additional detail with regard to the description of FIG. 7 provided hereinafter.

Decision Rule Module

The predicted response at the LOI is fed into the decision rule module 314 in which a decision is made regarding the hazardous potential of the earthquake response with respect to a-priori chosen decision rules and criterions. In other terms, if the predicted response increases a priori chosen intensity threshold (for example in terms of Richter scale magnitude) it means that it might have hazardous implications at the LOI in term of danger to human lives, facilities or environment. If no hazardous effects are predicted, no further action is performed. Else, the communication module comes into play.

The Communication Module

At the central server 10, the predicted response is sent to the communication module, which is responsible for sending the procreate warnings and safety instructions to the end users of the system, for example the authorities, emergency forces, expert staff or citizens at the LOI. The communication can be made via any communication technology, i.e. wired, wireless, internet and more. The information can be shared with the users via various interfaces such as mobile phones, PCs, dedicated computational systems and more.

In conclusion, faster and more accurate forecasting abilities are provided, allowing for real-time prediction of seismic-induced damage in chosen LOIs before occurrence. This allows for informing the establishment of required safety precautions before the seismic wave reaches locations under risk, as well as allowing safety actions to be taken in populated areas, and facilities of major interest or hazardous potential. The present system and method enables preparation for effects of seismic-induced damage, and thus is of great importance for a wide range of societal issues, including human health and safety, homeland security, environment, and ecology.

As previously mentioned, in accordance with the present system and method, each of the sensors 4 within the array are in communication with the central server 10. Communication between the sensors 4 and the central server 10 may be provided by any wired or wireless communication connection 12 that is known by those having ordinary skill in the art. Ideally, such connection is a high speed connection so as to allow readings detected by the sensors 4 to be transmitted to the central server 10 as fast as possible.

An example of the central server 10 is shown in the schematic diagram of FIG. 7. Functionality as performed by the present system and method, as previously described, is defined by software modules within the central server 10. The central server 10 contains a processor 102, a storage device 104, a memory 106 having software 108 stored therein that defines the abovementioned functionality, input and output (I/O) devices 110 (or peripherals), and a local bus, or local interface 112 allowing for communication within the central server. The local interface 112 can be, for example but not limited to, one or more buses or other wired or wireless connections, as is known in the art. The local interface 112 may have additional elements, which are omitted for simplicity, such as controllers, buffers (caches), drivers, repeaters, and receivers, to enable communications. Further, the local interface 112 may include address, control, and/or data connections to enable appropriate communications among the aforementioned components.

The processor 102 is a hardware device for executing software, particularly that stored in the memory 106. The processor 102 can be any custom made or commercially available single core or multi-core processor, a central processing unit (CPU), an auxiliary processor among several processors associated with the present central server 10, a semiconductor based microprocessor (in the form of a microchip or chip set), a microprocessor, or generally any device for executing software instructions.

The memory 106 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 106 may incorporate electronic, magnetic, optical, and/or other types of storage media. Note that the memory 106 can have a distributed architecture, where various components are situated remotely from one another, but can be accessed by the processor 102.

The software 108 defines functionality performed by the central server 10, in accordance with the present invention, as previously described. The software 108 in the memory 106 may include one or more separate programs, each of which contains an ordered listing of executable instructions for implementing logical functions of the central server 10, as described below. The memory 106 may contain an operating system (O/S) 120. The operating system essentially controls the execution of programs within the central server 10 and provides scheduling, input-output control, file and data management, memory management, and communication control and related services.

The I/O devices 110 may include input devices, for example but not limited to, a keyboard, mouse, scanner, microphone, etc. Furthermore, the I/O devices 110 may also include output devices, for example but not limited to, a printer, display, etc. Finally, the I/O devices 110 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the central server 10 is in operation, the processor 102 is configured to execute the software 108 stored within the memory 106, to communicate data to and from the memory 106, and to generally control operations of the central server 10 pursuant to the software 108, as explained above.

When the functionality of the central server 10 is in operation, the processor 102 is configured to execute the software 108 stored within the memory 106, to communicate data to and from the memory 106, and to generally control operations of the central server 10 pursuant to the software 108. The operating system 120 is read by the processor 102, perhaps buffered within the processor 102, and then executed.

When functionality of the central server 10 is implemented in software 108, it should be noted that instructions for implementing the central server 10 can be stored on any computer-readable medium for use by or in connection with any computer-related device, system, or method. Such a computer-readable medium may, in some embodiments, correspond to either or both the memory 106 or the storage device 104. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 102 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where functionality of the central server 10 is implemented in hardware, the functionality can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Returning to FIG. 1, a user of the present system and method may communicate with the central server 10 via an end user device 50 such as, but not limited to, a cell phone, a laptop computer, computer tower, or other end user device capable of communicating with the central server 10. Components of the end user device 50 may be similar to the central server 10, and therefore, is not described in additional detail herein. Communication between the end user device 50 and the central server 10 may be provided by wireless communication, other long range communication, or other means of network communication so as to allow the end user to interact with the central server 10. Such interaction between the end user and the central server 10 may include the central server 10 transmitting notification of an earthquake to the end user device 50, such as an alert with magnitude of an earthquake and a countdown to arrival at a point of interest specified by the end user. For example the end user device 50 may have an application downloaded thereon for providing a graphical user interface to allow interaction by the end user, or simply receiving news alerts.

In contrast to the known computational models used to model soil which demand numerous experimental data and enormous computational efforts, the pre-tuned machine learning model used by the present system and method use previously measured seismic data in order to capture the patterns of energy propagation through the soil and forecast the energy reached in locations of interest in real-time.

We claim:

1. A method for providing real-time prediction and mitigation of seismically-induced effects, comprising the steps of:

receiving measured seismic data, wherein the measured seismic data contains dynamic data and temporal data;
pre-processing the measured seismic data to transform the measured seismic data to a uniform format;
inputting the preprocessed data into a predictive model;
training the predictive model so that the predictive model learns hidden patterns in recorded seismic data, and extracts underlying relations between the received measured seismic data and a predicted response at a location of interest at further time instance, as described by the equation $u_f^{pred}(t+\tau) = model(u_f(t), u_{M_1}(t), u_{M_2}(t), \ldots, u_{M_N}(t))$ where t is the current time instance, $\tau$ is the lead time, $u_{M_i}(t)$ represents the digital signal recorded by the $i^{th}$ seismic sensor, and N is the overall number of sensors in a sensors array that provided the measured seismic data;
receiving new real-time seismic data and pre-processing the received new real-time seismic data into the uniform format;
inputting the pre-processed received new real-time seismic data into the predictive model; and
the predictive model predicting future response at the location of interest in lead time of $\tau$ ahead: $u_f^{pred}(t+\tau)$.

2. The method of claim 1, wherein the step of preprocessing the measured seismic data further comprises:

transforming all digital signals to a chosen uniform dynamical value;
correlating the digital signals with respect to time;
interpolating all digital signals so all data points of all digital signals correspond to the same time steps;
reducing length of the digital signals;
normalizing the digital signals to fit the range of [−1, 1];
dividing all digital signals to segments having identical length; and
compiling the divided signals into a data structure that serves as the input of the predictive model.

3. The method of claim 2, wherein the chosen uniform dynamical value is acceleration.

4. The method of claim 2, wherein the length of the digital signal is reduced by re-sampling the resulting signals with respect to a desired sampling rate.

5. The method of claim 1, wherein the predictive model consists of a long-short memory term recurrent neural network (LSTM RNN).

6. The method of claim 1, wherein the predefined threshold is $10^{-6}$.

7. The method of claim 1, further comprising further training of the predictive model using the pre-processed received new real-time seismic data.

8. The method of claim 1, further comprising the step of ceasing training of the predictive model when convergence of the training step is obtained, which is when a determined loss function is lower than a predefined threshold.

9. The method of claim 1, further comprising transmitting the predicted future response at the location of interest to a user device.

10. The method of claim 1, wherein the user device is selected from the group consisting of a cell phone, a laptop computer, and a computer tower.

11. The method of claim 1, where the predicted future response at the location of interest is used to determine a hazardous potential of an earthquake associated with the received new real-time seismic data.

12. The method of claim 1, wherein the measured seismic data is received from an array of vibration sensors.

13. The method of claim 1, wherein the steps of claim 1 are performed by a central server.

* * * * *